United States Patent [19]

Kleen et al.

[11] 3,811,124

[45] May 14, 1974

[54] SOLID STATE GAS PANEL DISPLAY CIRCUITS WITH NON-INDUCTIVE SOLID STATE ISOLATION BETWEEN LOW LEVEL LOGIC AND HIGH LEVEL DRIVE SIGNAL FUNCTIONS

[75] Inventors: Bergert G. Kleen; William R. Lamoureux, both of Kingston, N.Y.

[73] Assignee: International Business Machines Corporation, Armonk, N.Y.

[22] Filed: June 12, 1972

[21] Appl. No.: 261,773

[52] U.S. Cl.. 340/324 M, 315/169 TV, 340/173 PL

[51] Int. Cl. .......................................... H01j 11/00

[58] Field of Search ..... 340/324 R, 324 M, 173 PL; 315/169 R, 169 TV

[56] References Cited

UNITED STATES PATENTS

| | | | |
|---|---|---|---|
| 3,654,388 | 4/1972 | Slottow et al. | 340/324 M |
| 3,665,455 | 5/1972 | Schmersal et al. | 340/324 M |
| 3,609,746 | 9/1971 | Trogdon | 340/324 M |

*Primary Examiner*—John W. Caldwell
*Assistant Examiner*—Marshall M. Curtis
*Attorney, Agent, or Firm*—Robert Lieber

[57] ABSTRACT

Isolation circuits for low level to high level coupling are co-packaged with selection logic circuits and multiple high voltage switching line driver circuits of a gas discharge display panel. The package is an all solid-state cost-reduced configuration subject to enhanced flexibility of operation. The high voltage switching line driver circuits operate in bistable mode and receive selective low voltage pre-conditioning during quiescent sustaining phases (dead times) of write/erase cycles of panel discharge manipulation. The selectively pre-conditioned switching circuits operate in parallel, during the active phase of the write/erase cycle, to control selective write/erase conditioning of multiple panel sites. The isolation circuits are enabled and disabled at discrete phases of a floating reference potential which tracks the sustaining voltage. Consequently, coupling between low level digital sources, selection decoding circuits and drive switching circuits occurs only during quiescent phase (dead time) of the sustaining voltage. Since the isolation circuits, selection circuits and drive switching circuits are capable of extremely fast pre-conditioning operation in comparison to the minimum duration of a write/erase cycle (nanoseconds compared to multi-microseconds), it is possible to selectively precondition latching elements associated with an entire line of panel sites (row or column), or any fraction thereof, and thereby manipulate any part or the whole of a line of panel discharge sites in each write/erase cycle.

14 Claims, 14 Drawing Figures

SOLID STATE GAS PANEL DISPLAY CIRCUITS WITH NON-INDUCTIVE SOLID STATE ISOLATION BETWEEN LOW LEVEL LOGIC AND HIGH LEVEL DRIVE SIGNAL FUNCTIONS

CROSS REFERENCE TO RELATED APPLICATIONS

This application concerns an improvement of a gas discharge panel control system described in co-pending Patent Applications, Ser. Nos. 885,086 and 238,572, of T. N. Criscimagna and A. O. Piston, filed respectively on Dec. 15, 1969 and Mar. 27, 1972; and entitled respectively, "Improved Method and Apparatus For A Gas Display Panel" and "Floating Addressing System for Gas Panel" said application Ser. No. 238,572 filed Mar. 27, 1972 being a continuation of said application Ser. No. 885,086 filed Dec. 15, 1969.

BACKGROUND OF THE INVENTION

Power consumption, circuit packaging density, fabrication cost and operating speed (write-erase rate) are important factors affecting large scale commercial utilization of gas discharge display panels. It is well known to use multiple transformers, optical couplings or similar isolation devices, to establish coupling between low voltage digital signal sources and multiple line drive high-voltage switching circuits. However, these devices are costly, bandwidth limited, bulky and consume considerable power. An exemplary system using such transformer coupling is described in the above-referenced co-pending patent applications of T. N. Criscimagna et al.

Even with transformer couplings the system of the Criscimagna et al. disclosure is not easily adaptive to parallel selective manipulation of an entire line of discharge sites spanning one panel coordinate. Thus, since it is usually necessary to interpose at least one sustaining cycle between successive writing operations (to prevent excessive dissipation of existing polarization conditions of the panel), the maximum rate of panel write/erase manipulation in such systems is significantly curtailed by comparison to a system having full parallel line write/erase capability.

In all known systems of the prior art adaptation for parallel write/erase of full lines would ostensibly require introduction of multiple transformers, or other isolation coupling devices, between individual line drive switches and the low voltage selection signals. This however is impractical if operational and packaging efficiency are desired.

These disadvantages of prior art systems are avoided by our invention. We co-package solid-state high voltage switching circuits with all solid state latching elements, selection circuits and isolation circuits. We further provide on-off conditioning of the isolation circuits with a floating threshold voltage which tracks the sustaining voltage. The isolation circuits thereby effect pre-conditioning coupling of low level digital selection signals to low voltage inputs of individual latching elements, via the intervening selection decoding circuits, only during quiescent phase of the high sustaining voltage (dead times). This enables us to rapidly precondition a large number of latching elements selectively one at a time (to set up selective drive switching control conditions for parallel manipulation of a full line of panel sites in one coordinate direction; row or column) during a fraction of the quiescent sustaining phase preceding each write/erase manipulation.

Thus, we achieve advantages of highest density least cost circuit packaging with optimum flexibility and speed of panel discharge manipulation. Our system is considered optimally flexible because it adapts most easily to manipulating both fractional line groups of panel sites, for character image tracing, and complete line groups of panel sites for pictorial (graphic) image tracing.

The foregoing and other features, objectives and aspects of our invention may be appreciated from the following detailed description.

DETAILED DESCRIPTION

Figure 1:
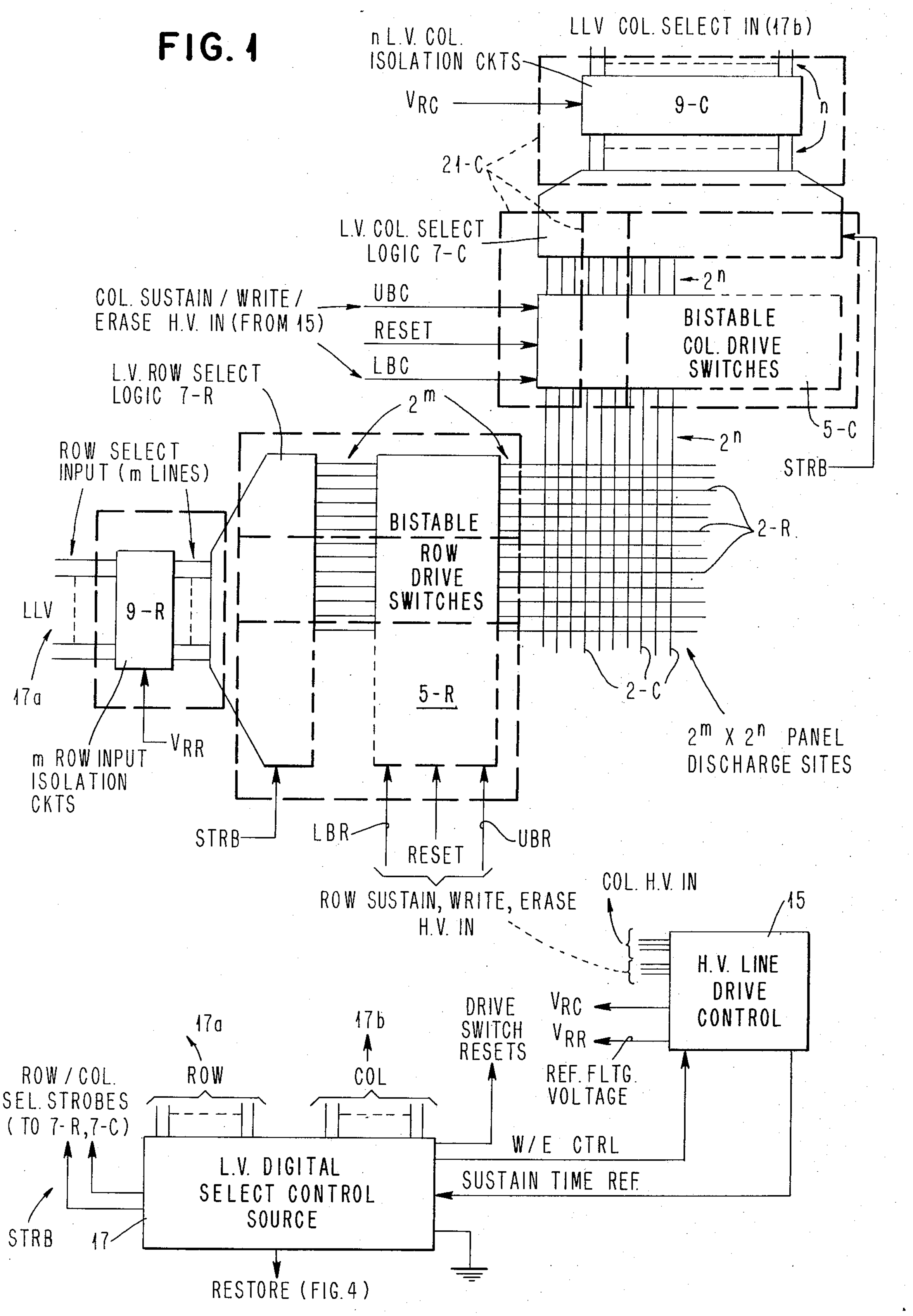
FIG. 1 schematically illustrates a gas panel display, with integrally packaged all solid state selection interfacing circuits, in accordance with our invention.

Referring to FIG. 1, an exemplary panel comprises a grid array of $2^m \times 2^n$ illumination emissive discharge sites formed at intersections of transverse row and column conductors 2–R and 2–C, respectively; m and n being arbitrary positive integers. Coupling of high voltage write/erase drive excitation to the individual panel conductors is controlled by respective all-solid-state bistable row drive circuits 5–R and column drive switch circuits 5–C.

As used herein, the term "bistable drive switch circuit" is intended to represent a circuit capable of being selectively preconditioned by a low voltage pulse to control the coupling of one of two voltage conditions of a high voltage drive pulse which follows the low voltage preconditioning pulse in time and has much longer duration than the low voltage pulse. Since there is one drive switching circuit 5–R for each panel line, it will be understood that there are $2^m$ individual bistable circuits 5–R and $2^n$ individual circuits 5–C.

Row (respectively column) circuits 5–R (respectively 5–C) have preconditioning inputs coupled to respective outputs of all-solid-state row (respectively column) selection decoding circuits 7–R (7–C); the latter having $m(n)$ inputs, $2^m(2^n)$ outputs and intervening logic circuits for translating $m(n)$ digit coded input signals of short duration to marking of a respective one of the $2^m(2^n)$ outputs. The term short duration used here has reference to the relatively long duration timing of write/erase drive excitation functions described below.

The digital inputs to the selection decoding circuits 7–R(7–C) are developed and conveyed through respective all solid state isolation circuits 9–R (9–C); there being an individual such isolation circuit for each digital input. Accordingly, it will be understood that block 9–R represents m discrete (although preferably integrally co-packaged) isolation circuits as described hereafter and similarly block 9–C represents n isolation circuits.

All row (column) drive switch circuits 5–R (5–C) are connected in parallel between a pair of lower and upper row (column) drive excitation supply busses LBR, UBR (LBC, UBC). These four buses connect to outlets of high voltage drive supply controls 15.

The low voltage ground-referenced isolation circuits 9–R (9–C) are conditioned jointly to enabled and disabled states by floating high voltage reference potential $V_{RR}$ ($V_{RC}$) supplied by controls 15. $V_{RR}$ ($V_{RC}$) is a voltage tracking the voltage on lower bus LBR (LBC). Low voltage controls 17, for instance a solid state digital data processing system, supply row and column digital inputs 17*a*, 17*b* at low voltage levels to circuits 9–R, 9–C respectively. Circuits 17 also supply row and column strobe signals, synchronous with respective inputs 17*a*, 17*b*, to AND-gating elements of respective decoding circuits 7–R, 7–C to provide timed gating control over the coupling of respective decoded signals to the preconditioning inputs of switches 5–R, 5–C.

The circuits 5–R, 7–R and 9–R (respectively 5–C, 7–C, 9–C) are preferably co-packaged in large scale integrated circuit modules indicated for exemplary purposes by broken lines 21–R (respectively 21–C). The circuits 15 and 17 may also be co-packaged if space is available. The co-packaged circuits may be mounted either upon the basic glass substrate of the panel or upon a separate substrate. In general, the source circuits 15 and 17 of low voltage selection and strobe signals and high voltage drive signals will be mounted upon a separate substrate.

Figure 2:
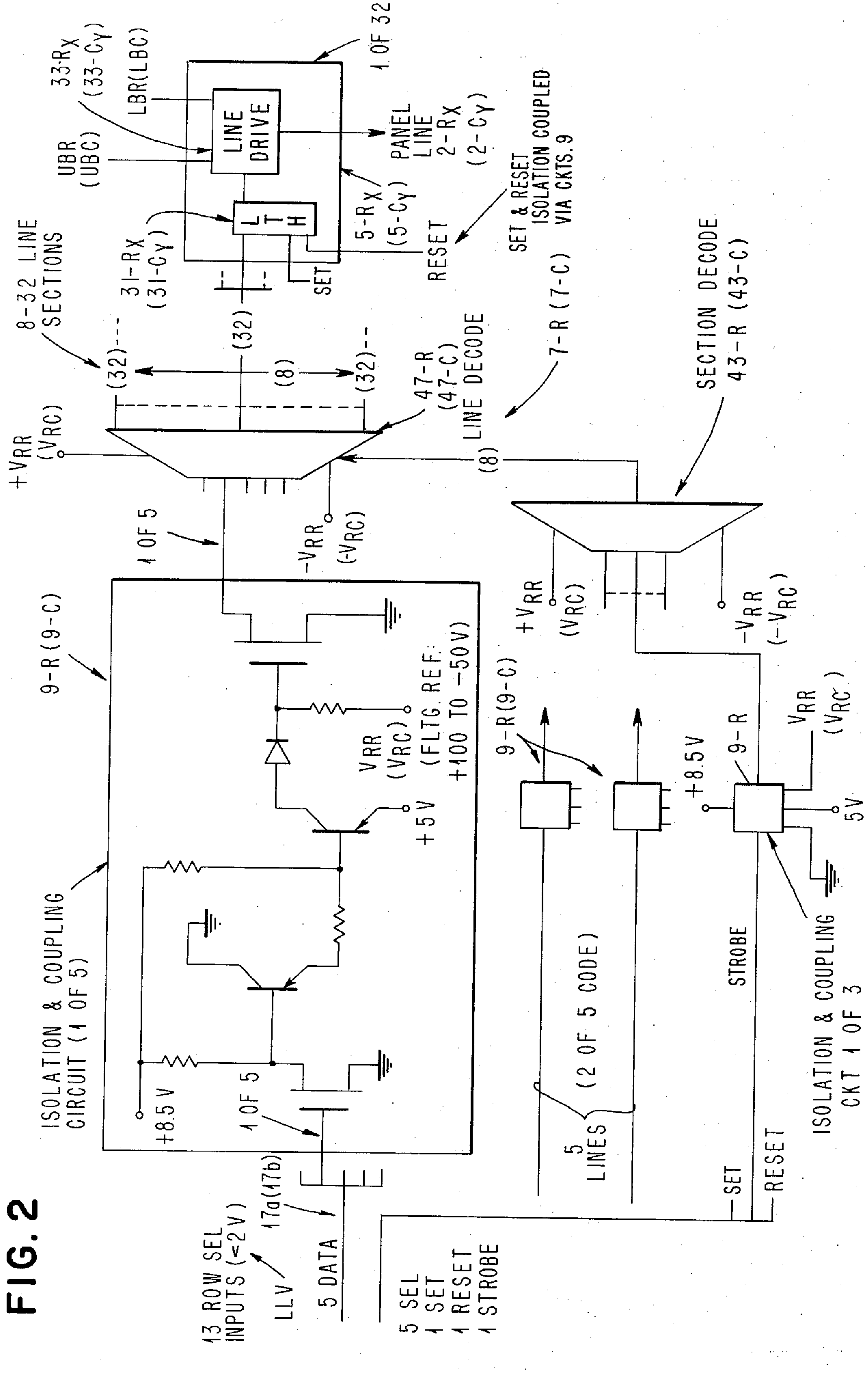
FIG. 2 provides schematic illustration, in a more specific and comprehensive view, of representative circuits associated with panel lines (row or column)
Figure 3:
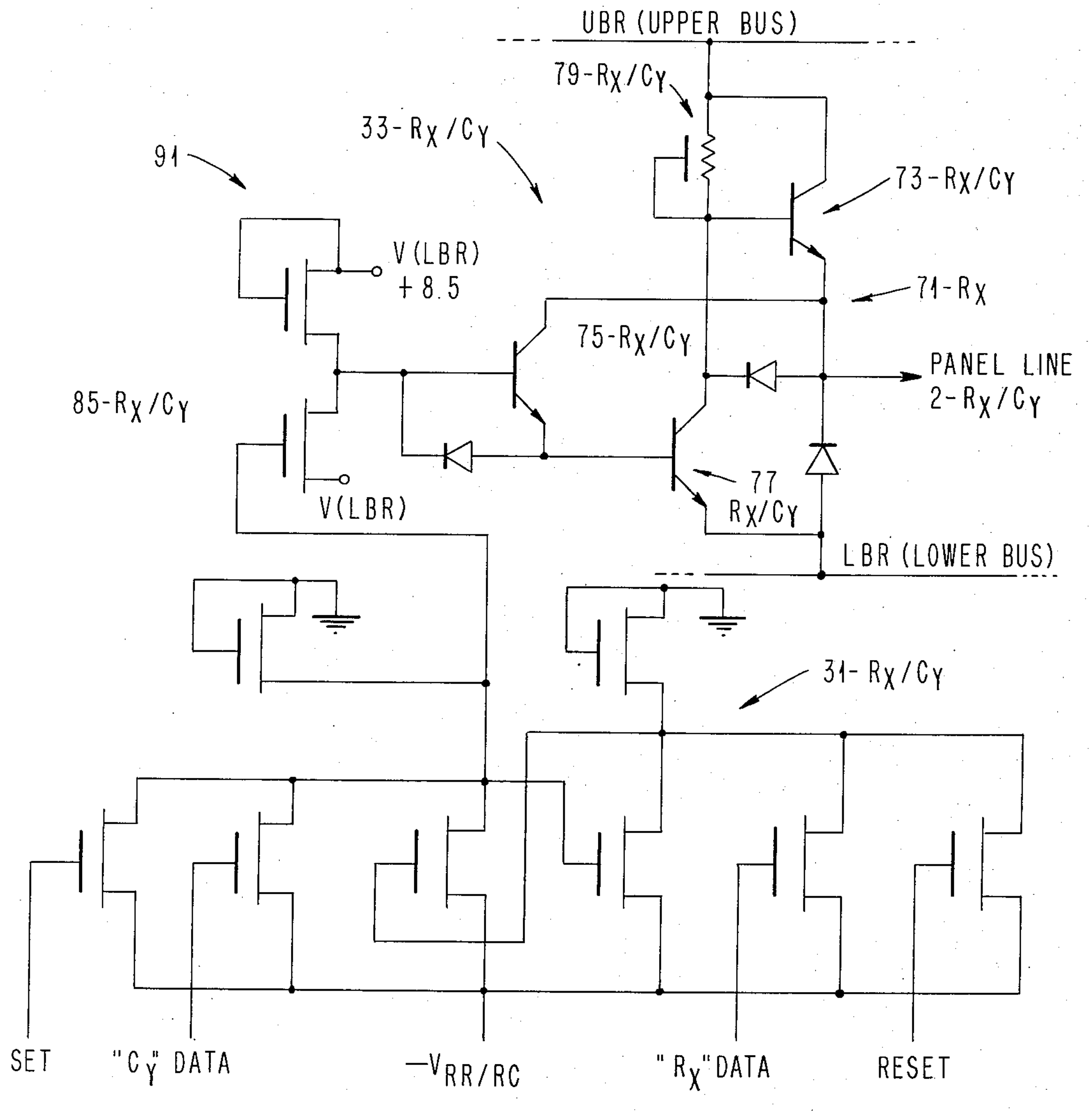
FIG. 3 illustrates one of our coordinate line driver circuits with latching control as represented in block outline in FIGS. 1 and 2.

Referring to FIG. 2, which illustrates the control for row (respectively column) panel lines in an exemplary configuration of 256 × 256 panel lines, thirteen low level digital row (column) input lines 17*a*, (17*b*) couple through respective isolation circuits 9–R (9–C) to selection decoding circuits 7–R (7–C). Decoded outputs of 7–R (7–C) represented by 7–$R_X$ (respectively 7–$C_Y$) connect to respective bistable circuits 31–$R_X$ (respectively 31–$C_Y$) designated as latches. Outputs of latches 31–$R_X$ (31–$C_Y$) connect with respective high voltage drive switching circuits 33–$R_X$ (respectively 33–$C_Y$). Latches 31–$R_X$ (31–$C_Y$) and respective switch circuits 33–$R_X$ (33–$C_Y$) comprise bistable drive switch circuits 5–$R_X$ (5–$C_Y$). Latches 31–$R_X$ (31–$C_Y$) are settable to complementary conditions by the jointly applied reset input and the individually applied output position $x(y)$ of decoder 7–R(7–C). Details of representative circuits 31–$R_X$ (31–$C_Y$) and 33–$R_X$ (33–$C_Y$) are shown in FIG. 3.

Isolation circuits 9–R (9–C) are effective to couple to respective inputs of selection decoder circuits 7–R (7–C) only when the corresponding lower bus LBR (LBC) is at ground; the appropriate VR then being slightly negative relative to ground (GND). Voltage on LBR (LBC) fluctuates between positive and GND levels as the cyclic sustaining voltage cycles through active (sustaining) and idle (dead) phase conditions. Thus circuits 9–R are in coupled condition during the inactive phases B,D of sustaining cycles (see FIG. 6) and is decoupled or disabled condition during active sustain discharge phases A,C.

Circuits 7–R (7–C) comprise a first section 43–R (43–C) responsive to 2 to 5 of the isolation coupled inputs 17*a* (17*b*) to select one of the eight output lines associated with corresponding one of eight groups of 32 line drive switch circuits 5–R (5–C), and a second section 47–R (47–C) responsive to five other (data) inputs of 17*a* (17*b*) in combination with the output of 43–R (43–c) to provide preconditioning coupling to $R_X$ ($C_Y$) Data input (FIG. 3) for reset (set) conditioning of latch 31–$R_X$ (31–$C_Y$) of a selected one of the switch circuits 5–$R_X$ (5–$C_Y$) in the group designated by the output of 43–R (43–C). The isolation coupled strobe inputs to circuits 43–R (43–C) complete the conditioning of 43–R (43–C) enabling the selectively designated latch 31–$R_X$ (31–$C_Y$) to flip to the appropriate state (set in "$C_Y$"; reset in "$R_X$") for controlling the drive excitation to the panel.

The number of latch elements 31–R or (31–C) which can be set in this way in any one sustain dead phase is a function of the duration of the dead phase (i.e., the duration of GND state of LBR/LBC) and the frequency of the strobe and selection signals. The strobe and selection signal frequency in turn is limited only by the bandwidth capabilities of the low voltage circuits 9–R (9–C) and the sources of signals 17*a* (17*b*). As will be seen later, the voltage on LBR (LBC) remains at GND level for intervals of multi-microsecond duration whereas circuits 9–R (9–C) and the sources of signals 17*a* (17*b*) are capable of operating at nanosecond repetition intervals. Thus, it will be seen that any or all of the latches of one panel coordinate may be preconditioned in the dead phase between any two sustain pulses.

Figure 6:
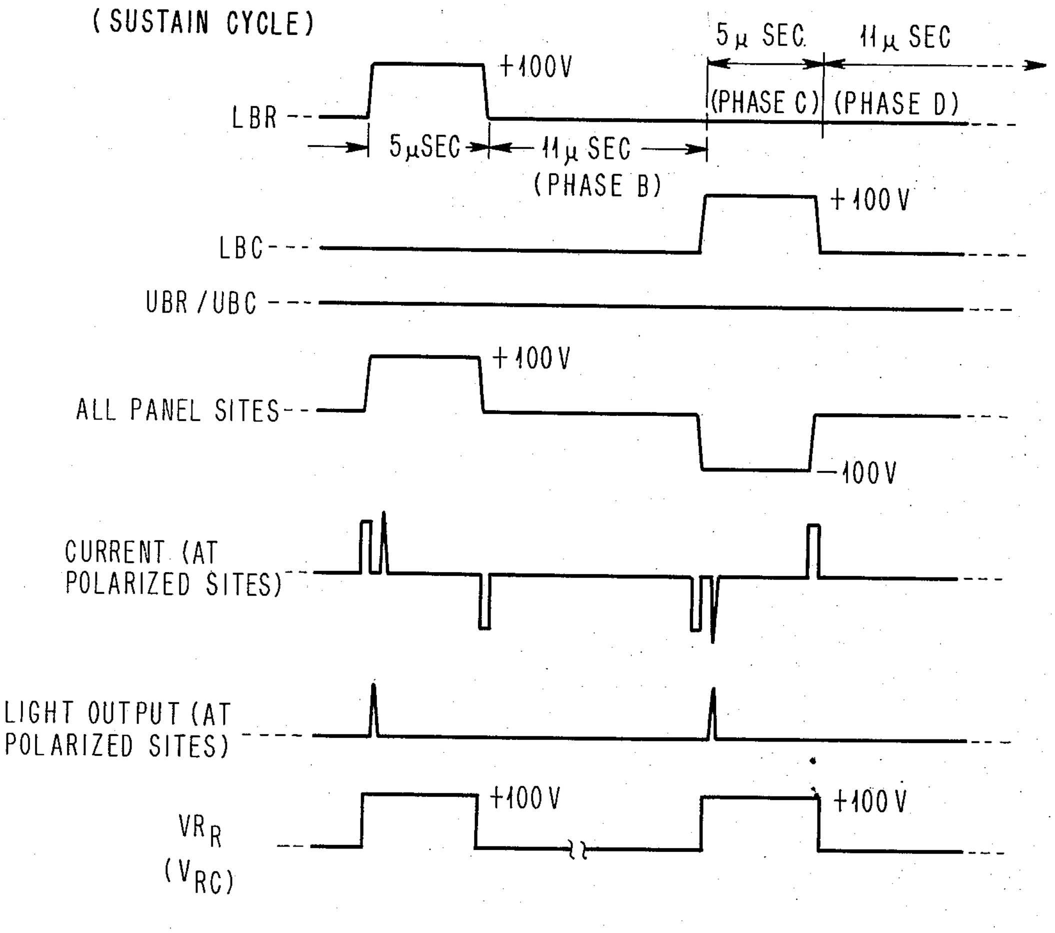
FIGS. 6–9 illustrate waveforms of sustain, write, erase and latch control signals characteristic of the operation of our invention.

Referring to FIG. 6, the sustain cycle, having nominally 32 microsecond duration, is subdivided into phases A, B, C and D distinguished by signals appearing on the lower row and column buses (LBR, LBC). During sustain cycles, upper row and column buses (UBR, UBC) are held at constant 0 voltage level relative to the voltages appearing on respective lower buses LBR, LBC. It will be understood that the upper buses are transformer coupled high voltage drive circuits so as to permit signals thereon to add algebraically while referenced to the lower buses.

The relationship between the sustain voltages on LBR, LBC and the corresponding voltages applied to the panel discharge sites is indicated in the fourth line of FIG. 6. The panel discharge sustaining currents are illustrated at the fifth line of FIG. 6 and the corresponding light emission outputs are illustrated in the sixth line of FIG. 6. The relationship between $V_{RR}$ ($V_{RC}$) and the sustain voltage is suggested in the seventh line of FIG. 6.

Figure 7:
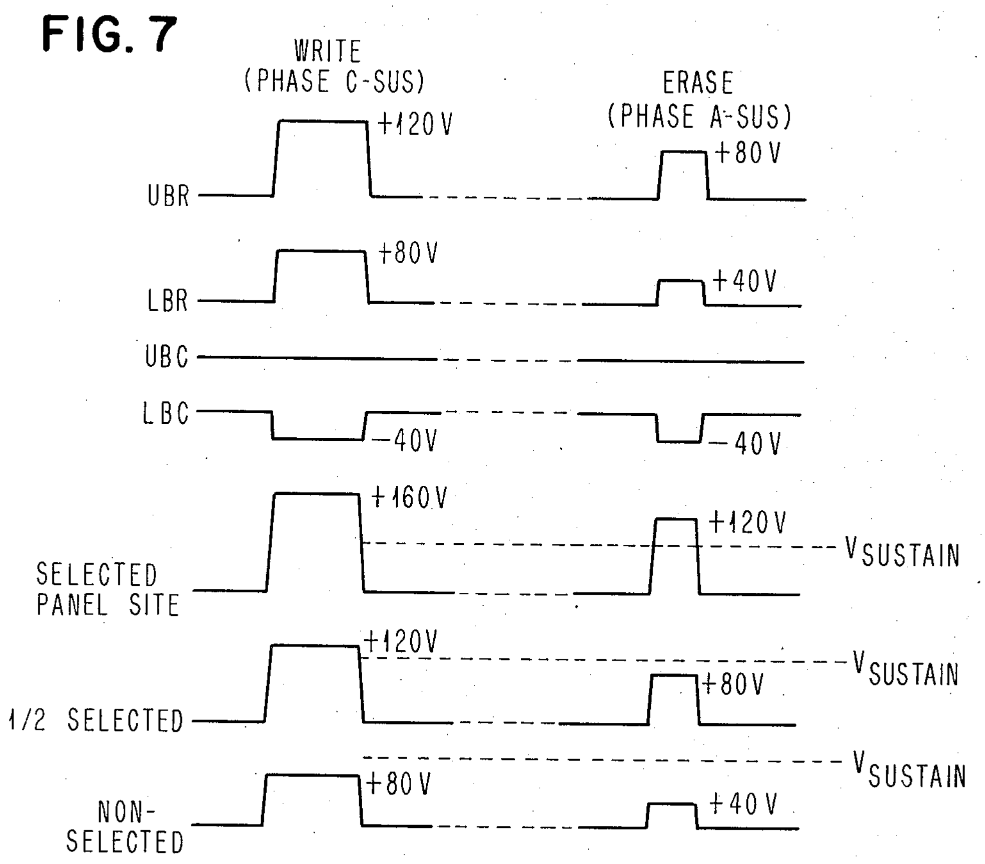

Write and erase waveforms are indicated comparatively in FIG. 7. Write (respectively Erase) excitation is supplied only after sustain phase B (respectively D) i.e., in place of sustain phase C (respectively A). Each Write (Erase) is followed by at least one complete sustain cycle serving to sustain panel polarization. Write (erase) voltage on upper row bus UBR rises to 120 (80) volts positive while voltage on lower row bus LBR rises to 80 (40) volts positive. Upper column bus UBC remains at constant 0 volts and lower column bus LBC falls to −40 volts, for both write and erase. Write and erase differ in voltage - time product (as indicated in FIG. 7) and by "180°" in phase of occurrence relative to sustain cycling. Panel sites receiving full selection erase or write conditioning (+120 volts or +160 volts) are effectively connected to UBR and LBC via associated transverse panel lines (2–$R_X$, 2–$C_Y$) and drive switching circuits (5–$R_X$, 5–$C_Y$). Half-select excitation (+80 erase or +120 write) is delivered through selective connections established between LBR and LBC or between UBR and UBC. Non-select excitation (+40 erase, +80 write) derives from circuit connection of LBR to UBC. Note (compare FIGS. 6 and 7) that write follows sustain A in the same voltage polarity sense so that sustaining half-selected and non-selected sites cannot receive additional polarization (being fully "charged" so to speak, considering "capacitive" analogy). Note also that erase has reverse polarity sense to the last preceding sustain phase (phase C) and thereby acts to neutralize polarization of full-selected cells (sites).

Figure 8:
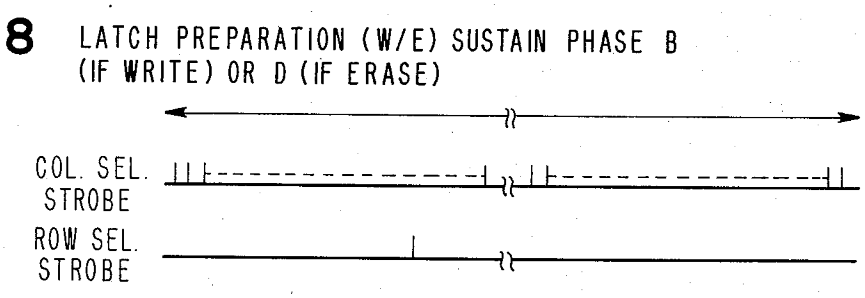

Column and row select strobe signals (FIG. 8), applied with appropriately coded latch selection signals 17*a*, 17*b* (FIG. 2), provide for preconditioning selection of a single row and multiple columns (up to 256 for the panel system of 256 column lines) in the sustain dead phase (phase B) preceding write conditioning, or in the sustain dead phase (phase D) preceding erase excitation. Thus, when write drive excitation occurs any combination of discharge sites traversed by a single row line may be selectively ignited in parallel by serially preconditioning multiple column circuits 5–C and one row circuit 5–R associated with sites to be ignited. Of course, it will be understood that vertical line images can also be written in parallel by pre-conditioning latches assocatied with one column line and multiple row lines. Note for block erase $C_Y$ data is loaded in B stage of sustain and $R_X$ data is loaded in the following D stage preceding the actual drive.

Figure 9:
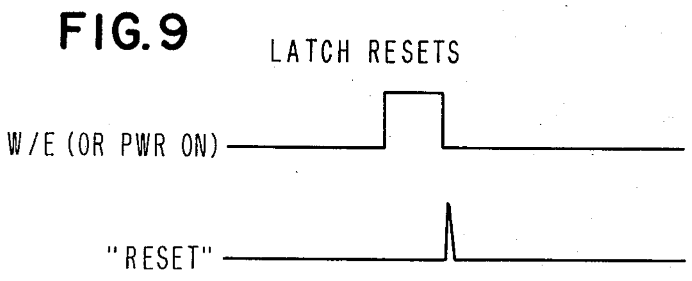
Figures 10, 11, 12, 13, 14:
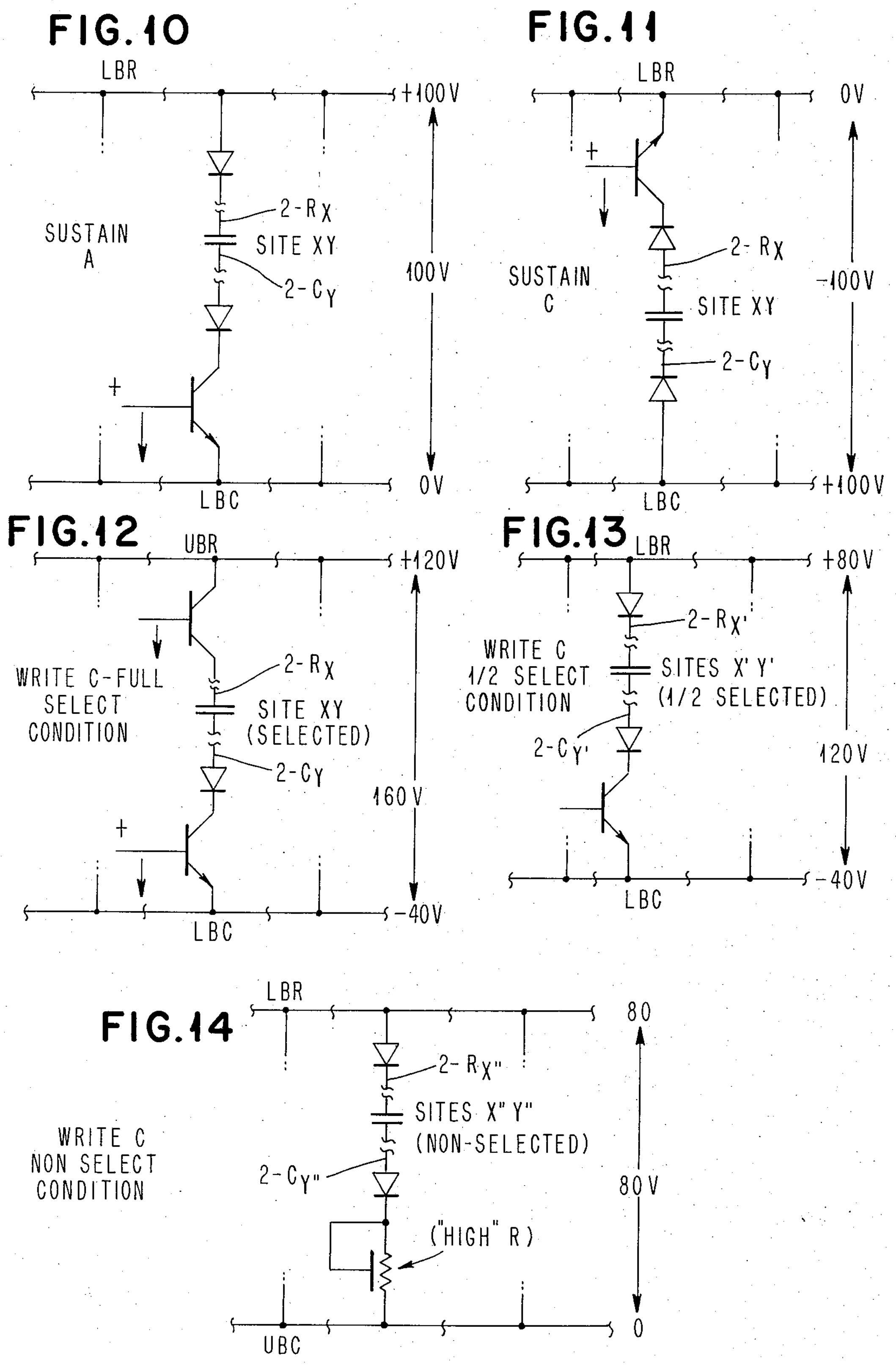
FIGS. 10–14 provide equivalent circuit illustrations of drive coupling conditions in respect to panel discharge sites.

FIG. 9 is intended to indicate that latches 31 are also "gang reset" immediately following write, erase or power-on conditioning of the panel so that all latches are in conditions appropriate to transfer the sustain signal shown at the fourth line of FIG. 6 to all discharge sites during normal sustain cycling (i.e., to connect LBR and LBC in circuit with all discharge sites). Were it not for this requirement, it would be possible to preserve the states of the latches for subsequent write/erase cycles whereby successive identical display lines could be written/erased without repetition of the latch preconditioning sequence. However, since at least one full sustaining cycle must be interposed between successive write/erase functions, it is preferred that the latches be "reset." In any event, storage of the digital preconditioning selection information supplied by source 17 (FIG. 1) does not pose a problem since this source in many instances will be a data processing system including storage. In the long run, this is probably about as effective as having the ability to retain write/erase conditions in the latching drive circuits 5–R (–C).

One should note that there is absolutely no inductive coupling, or other special device coupling required in source 17 or between 17*a*(*b*) and 9–R(–C). The only inductive coupling is to the four buses LBR, UBR, LBC, UBC from the source of write and erase excitation. This is obviously minimal by comparison to the system disclosed in the above-referenced Patent Applications of Criscimagna et al.

Figure 4:
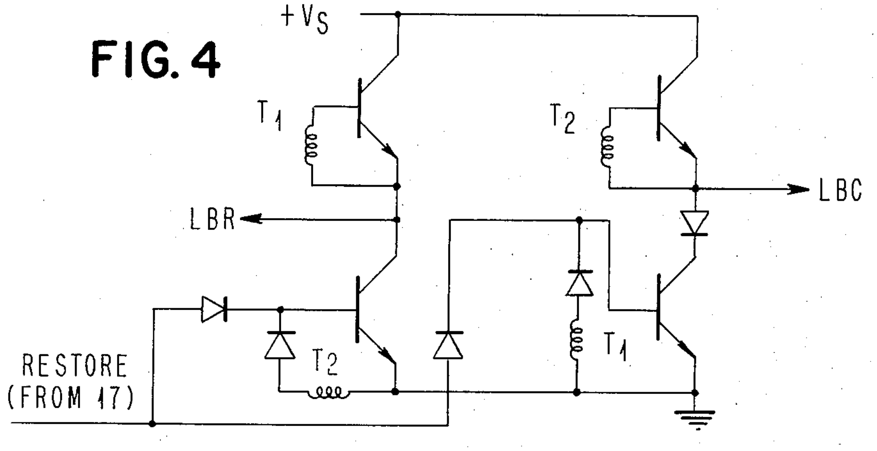
FIG. 4 illustrates the circuits for supplying sustaining and write/erase drive excitation to lower buses of upper-lower row and column bus pairs.
Figure 5:
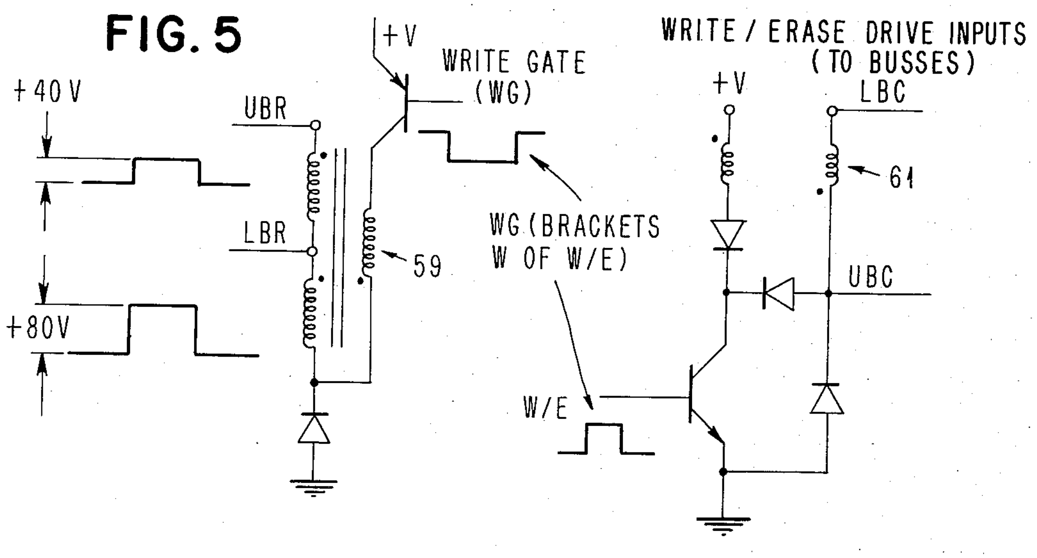
FIG. 5 illustrates circuits for coupling write and erase drive excitation to the above bus pairs.

FIGS. 4 and 5 illustrate the circuits for supplying sustain, write and erase excitation to the buses LBR, UBR, LBC and UBC. In sustaining phase A, windings T1 are energized causing respective transistors to conduct and thereby connect LBR with sustain supply voltage $V_S$ (+100 volts) and LBC with GND. In sustain phase C windings T2 are energized causing respective transistors to conduct and connect LBC with $V_S$ and LBR with GND. During dead times, between sustaining pulses (phases B and D), buses LBR and LBC are restored to GND potential by "restore" input from 17.

FIG. 5 indicates that timed write/erase excitation is transferred to row bus pair UBR, LBR through coupling network 59 while associated write/erase pulse excitation is supplied to UBC and LBC through an inductive coupling 61 linked to network 59.

FIG. 7 indicates the write/erase voltage relationships on the buses and across the selected, half-selected and non-selected panel discharge sites. During write/erase the sustain signal phase C/A is suppressed.

FIG. 3 indicates that drive switch circuits 33–$R_X$ (33–$C_Y$) comprise bipolar transistors 73,75,77, non-linear (pinch) resistor 79 and diodes in a hybrid configuration which couple via all FET low level circuit 85 to the FET latch circuit 31. All of the decoding circuits may be mounted together on a single chip if desired, and coupled through one off-chip circuit 91. It will be noted that the row switching circuit and column drive switching circuits are differently coupled to respective latch element outputs for purposes which will be explained next.

In the system as implemented with all NPN devices, it becomes necessary to reverse the select-deselect states of the drivers. This is for the algebraic addition of drive voltages required across the panel sites. Reference FIG. 3 where "$C_Y$ data" and "$R_X$ data" input to opposite set and reset conditioning sides of a typical latch and FIGS. 10–14.

DRIVE CONTROL/LATCH ELEMENT RELATIONSHIPS

| | Sustain | Write/Erase | | | |
|---|---|---|---|---|---|
| | | Select | ½ Select | | Non-Select |
| 5-$R_X$ | Set (all X) | Reset | Reset | Set | Set |
| 5-$C_Y$ | Set (all Y) | Set | Reset | Set | Reset |

The foregoing table indicates that for sustain operation, all latches 31 (FIGS. 2,3) are placed in "set state condition" by common conditioning of their "set input lines" (FIG. 3). As indicated earlier, with reference to FIG. 9, this conditioning represents the "resetting" of the latches and occurs immediately following any write, erase or power-on operation. The table further indicates that in preparation for write and erase manipulation paired row and column latches associated with specific panel sites to be affected are appropriately preconditioned while sustain drive is at null level. Conversely latch pairs associated with other sites remain in "de-select" states induced by appropriate preconditioning. For "select" conditioning the row latch 31 of the pair to be affected is placed in reset condition and the column latch of the same pair is placed in set condition whereas for "de-select" conditioning the row and column latches associated with "de-selected" panel site receive either half-select pre-conditioning (i.e., row and column latches both reset or both set or full de-select preconditioning (row latch set conditioned column latch reset conditioned). Since all latches 31 are placed in set condition at the fall of the sustaining drive function to null (quiescent) level the necessary "reset" pre-conditioning of only the row latches associated with panel sites to be written or erased is effected simply by selective transfer of appropriate conditioning signals to the "$R_X$ Data" inputs (FIG. 3) of the associated latches. However, the corresponding "set" pre-conditioning of only the column latches associated with sites to be "select" driven requires prior "reset" pre-conditioning of all column latches followed by application of set pre-conditioning to "$C_Y$ Data" inputs of the selected latches. Alternatively, column latches of "de-selected" sites may be "reset" pre-conditoned via "$R_X$ Data" input lines without prior "reset" conditioning of other latches.

SUMMARY OF OPERATION

Matrix drive switches of monolithic construction are employed at absolute voltages exceeding the device ratings by familiar referencing techniques. Communication with these switches of any number up to full parallel operation is made possible through selection logic and per switch memory elements, all of which is floating at or close to the switch reference and all of which is accessed through a minimal width path of solid state isolation during quiescent phases of the panel sustaining cycle.

Examples of System Operation For Pictorial (Raster) Image and Discrete Character Image Writing:

One should note that because we employ a switch per line and a memory element per switch, it is possible to operate on an entire line (parallel to the panel matrix axes) for pictorial generation or upon any portion of a line for alphanumeric tracing.

We have shown and described above the fundamental novel features of the invention as applied to several preferred embodiments. It will be understood that various omissions, substitutions and changes in form and detail of the invention as described herein may be made by those skilled in the art without departing from the true spirit and scope of the invention. It is the intention therefore to be limited only by the scope of the following claims.

What is claimed is:

1. A system for controlling operations of a gas discharge display panel having multiple conductive lines traversing discrete discharge cites and selectively conveying intermittent drive pulses from sources common to all lines to said sites; said pulses serving to effect writing, erasing and sustaining functions relative to said sites, said pulses having discrete dead time spacing of null voltage level between consecutive pulses;

plural sources of information pulses referenced to a low level fixed supply voltage; said information pulses having short durations by comparison to said drive pulses and being timed to occur only in dead time spacing intervals between occurrences of said drive pulses;

multiple floating powered bistable switching circuits, one per each said conductive line, each having connective elements coupled in series circuit configuration between individual said lines and said common drive pulse sources for selectively controlling application of said drive pulses to the respective lines in accordance with bistable conditions thereof;

a source of high level control voltage varying in time coordination with said drive pulses; and plural electrical selecting circuits connected to said control voltage source, said information pulse sources and said switching circuits for utilizing said information pulses to bistably precondition said switching circuits to select states exclusively during said dead time spacing intervals; said selecting circuits including unidirectionally conductive isolation circuits controllably biased by said control voltage to effect coupling of said information pulses while preventing said drive pulses from disturbing said information pulse sources through reflection of signals into and through said switching and selecting circuits; whereby said isolation circuits provide the effective coupling and isolation of transformers.

2. A solid state electrical circuit completely devoid of isolation transformers for utilizing low power (low voltage-low low time product) signals having fixed supply voltage references to control selective distribution of high power electrical pulses (large voltage-time product), from common sources to individual lines in an array of multiple lines, said pulses occurring intermittently at intervals separated by dead space intervals of at least a predetermined minimal duration, comprising:

a plurality of sources of said low power signals supplied by fixed reference power and operating in timed coordination with the source of said high power pulses; said sources providing said low power signals only in dead space intervals between occurrences of said high power pulses; successive said low power pulses designating selections of individual said lines as distribution objects and occurring at a signalling rate sufficiently high to be capable of conveying distribution of intelligence relative to each and all of said object lines during a single said dead space interval;

a source of floating reference control voltage varying in correspondence with said high power pulses;

electrical selection circuits including unidirectionally conductive elements controllably biased by said floating reference control voltage coupled directly to said low power signal sources for utilizing said low power signals to develop multiple preconditioning signals spatially associated with respective said lines during said dead space intervals and for isolating said low power sources from effects of said high power pulses during said occurrences of said high power pulses; and multiple bistable switching circuits subject to being conditioned by said pre-conditioning signals for providing selective series circuit connection paths between said sources of high power pulses and said lines.

3. In a system for controlling operations of a gas discharge display panel, in which multiple conductive lines traversing multiple discharge sites are used to convey electrical drive pulses from a common source to individual selected said sites in order to effect writing, erasing and sustaining effects relative to said selected sites and in which said drive pulses fluctuate intermittently between null and high amplitude levels relative to said sites with at least a predetermined minimum dead time spacing interval of null level output between successive high levels, the improvement comprising:

multiple floating powered bistable drive switching circuits one per each said line, having connective elements coupled in series between respective said lines and the source of said drive pulses to control selective distribution of said drive pulses to said lines in accordance with bistable conditions of respective said circuits;

a source of low level pre-conditioning signals having fixed power supply voltage reference and timed to occur only in the dead time spaces between consecutive high level fluctuations of said drive pulses;

a source of high level control voltage varying in timed coordination with said high level drive pulses; and all solid state selection circuit means, including unidirectionally conductive circuit elements controllably biased by said control voltage, coupled between said low level source and said switching circuits for effecting pre-conditioning of individual and switching circuits to select bistable conditions in accordance with signals supplied by said low level source in said dead time intervals;

said unidirectionally conductive circuit elements of said selection circuit means being isolation circuits completely devoid of reactive elements preventing said drive pulses from exerting conditioning or disturbing influence upon said low level source.

4. In a gas discharge display panel having multiple discharge sites manipulatable in response to electrical signals providing intermittent sustain drive conditioning to all sites and intermittent write/erase drive conditioning to selected sites, improved control means comprising in combination:

a source of floating reference control voltage fluctuating in timed coordination with said drive signals;

bistable drive switch circuit means powered by said control voltage having connecting elements coupled in series circuit between individual said sites and sources of said sustain and write/erase drive signals for controlling selective application of said write/erase drive signals to respective said panel discharge sites in accordance with bistable conditions preestablished in said bistable circuit means during dead time spacing intervals between said drive pulses; and selection circuit means coupled to said bistable switch circuit means in random selection configurations for establishing bistable connection conditions in individually selected said connecting elements exclusively in quiescent dead time intervals between occurrences of said intermittent sustain conditioning and write/erase drive signals.

5. In a gas discharge display panel having multiple discharges sites subject to emitting intermittent pulses of illumination when appropriately conditioned by sustain, write and erase drive signals applied from sources common to said sites through transverse row and column conductors crossing in selectable pairs at said sites, improved write/erase selection control circuits comprising:

a source of floating reference control voltage fluctuating in correspondence with said drive signals;

multiple all-solid state bistable high voltage drive switching circuit means, one per each said row and column conductor, said switching circuit means being powered by said control voltage and having individual connecting circuit elements in series circuit between the respective conductor and said common sources of drive signals, said bistable circuits and associated connecting elements being subject individually to receiving selective bistable pre-conditioning by random access selection of individual said bistable circuits in advance of occurrence of said write/erase drive signals, in order to provide thereby for bistable selective connection of said sustain, write and erase drive signals in parallel to respective selected conductors; and selection circuit means including unidirectionally conductive circuit elements controllably biased by said control voltage for supplying low voltage pre-conditioning signals selectively in random selective order to said drive switching circuit means to establish select bistable conditions in said drive switching circuit means in random selective sequence;

said unidirectionally conductive elements of said selection circuit means being interposed in the paths of said low voltage pre-conditioning signals for isolating the sources of said low voltage signals from the drive signals coupled through said connecting elements of said switching circuit means and for coupling said low voltage signals for utilization in conditioning said switching circuit means when said drive signals are quiescent.

6. Improved panel control circuit according to claim 5, wherein each said bistable drive switching circuit means comprises an all-solid state bistable latch circuit which is controlled by said control voltage, and an all-solid state connecting circuit containing a said connecting element for effecting high voltage switching of said drive signals via said connecting element; said switching circuit operating effectively as an open or closed contact under switching control established by the output state of said bistable latch circuit.

7. In a gas discharge display panel having multiple discharge sites formed at cross-positions of transverse row and column drive conductors and adaptive to receive intermittent high voltage drive conditioning in accordance with low voltage digital selection signals supplied during quiescent intervals between drive conditionings, improved isolation means comprising:

a source of control voltage varying in timed correspondence with said drive voltages;

all solid state coupling circuits having low level supply voltages of constant magnitude relative to the drive conditioning voltages; said coupling circuits including unidirectionally conductive circuit elements controllably biased by said control voltage and selection control signal inputs and outputs, said selection control inputs and outputs being subject to being conditionally coupled and decoupled depending upon the biased conditions of said unidirectionally conductive elements;

said control voltage varying intermittently between coupling and decoupling biasing levels in timed relation to transitions of said drive conditioning voltage to respective null and high amplitude levels thereby providing effective coupling between said selection signal inputs and outputs only during quiescent intervals between occurrences of said high level drive conditioning amplitudes.

8. In a gas discharge display panel having multiple discharge sites adaptive to receive joint intermittent high voltage sustain drive pulse conditioning for intermittent maintenance of light emission states at sites previously conditioned by selectively applied high voltage write drive pulses and adaptive further to receive erase conditioning by high voltage erase drive pulses, improved write/erase selection control means comprising:

multiple bistable switch circuit means coupled in discrete pairs to individual said sites for controlling coincident voltage selection of said sites by application jointly thereto of said sustain drive conditioning pulses and application selectively thereto of said write and erase drive conditioning pulses;

plural sources of parallel occurring low voltage selection conditioning code pulses having maximum durations which are extremely short relative to minimal durations of said sustain, write and erase pulses; and conditionally operative all solid state coupling circuit means connected between said low voltage sources and said bistable switch circuit means for conditionally effecting coupling of said low voltage pulses to produce selective input conditioning of said bistable switch means only in quiescent intervals preceeding occurrences of said write and erase pulses; said coupling circuit means including controllably biased unidirectionally conductive coupling elements which are forward biased to effect coupling of said low voltage pulses during said quiescent intervals and reverse biased to isolate said low voltage sources from said bistable switch means during said write and erase pulse occurrences and sustain drive occurrences.

9. In a gas panel display system in which light emission conditions are established and sustained by coincident applications of manipulative and sustaining drive voltages to light emissive cells formed at discrete crossovers of arrays of multiple cross-positioned conductors, wherein the sustaining drive voltage is characterized by recurrent generation of high voltage conditions separated in time by null voltage conditions persistent for predetermined dead time intervals and wherein the manipulative drive voltages are subject to being produced intermittently during selected intervals of generation of the high voltage levels of the sustaining drive voltage, the improvement of:

relatively isolated first and second circuits for respectively supplying said manipulative and sustaining drive voltages, said second circuit characterized by sustaining supply voltage inlets, drive bussing outlets common to said first circuit and solid state switching circuits arranged in series between said inlets and outlets; said switching circuits characterized by being devoid of discrete transformer elements in the series circuit paths between said supply inlets and bussing outlets; and a third circuit for establishing selective connections between said common bussing outlets and individual said cross-positioned conductors; said third circuit characterized by having all solid state integrated circuit construction totally devoid of discrete transformer components and thereby not subject to circuit delays and cost factors characteristic of transformer components; said third circuit including controllably biased unidirectionally conductive coupling elements serving to provide the effective coupling and isolation of transformers.

10. A system according to claim 9 wherein said third circuit comprises first, second and third stages arranged in tandem for utilization of low level condition selecting signals; the third stage including active solid state connective elements arranged in series circuit between said common drive bussing outlets and individual said conductors; said first and third stages being powered by respective fixed and floating referenced low level supply voltages; and said second stage containing said controllably biased unidirectionally conductive coupling elements and providing coupling between said first and third stages; said biasing of said unidirectionally conductive circuits of said second stage being arranged to be effective to permit coupling between said first and third stages only during presence of null voltage conditions at said drive bussing outlets and effective otherwise to decouple and isolate said first and third states.

11. A system according to claim 10 wherein said third stage comprises register and decoding sub-stages, said register sub-stage comprising a discrete latching element per each said connective element for indivually controlling said connective elements; and wherein said first stage is arranged to provide coded address signal functions to said third stage, said signal functions being subject to designating individual said latching elements for selection and subject to being decoded by said decoding sub-stage of said third stage for providing bistable conditioning inputs directly to said designated latching elements of said third stage; whereby said connective elements of said third stage are subject to receiving random access pre-conditioning to open and close conditions of control relative to respective connective elements in accordance with said coded address signal functions; said coded address signal functions being suppliable at recurrence rates and power levels which are not subject to being limited by transformer element delays.

12. A system according to claim 9 wherein said first circuit comprises manipulative supply voltage and discrete transformer and semi-conductor elements in series circuit between said manipulative voltage inlets and said common bussing outlets; said first circuit being characterized by having lesser power delivery capability relative to emission cells of said panel than said second circuit due to the presence of said transformer elements but having the advantage of being separately adjustable to said second circuit.

13. A system according to claim 9 wherein said second circuit comprises a bridge network of semiconductive switching circuit elements subject to effecting varied connection between said sustaining supply voltage and said bussing outlets subject to varied connection to said panel conductors under control of said third circuit.

14. A system according to claim 9 wherein sustaining operation of said second circuit is suppressed during active manipulative operation of said first circuit and operations of said first circuit are spaced at time intervals suitable for permitting existing light emission states of said panel cells to be sustained by operations of said second circuit.

* * * * *